Figure 1:
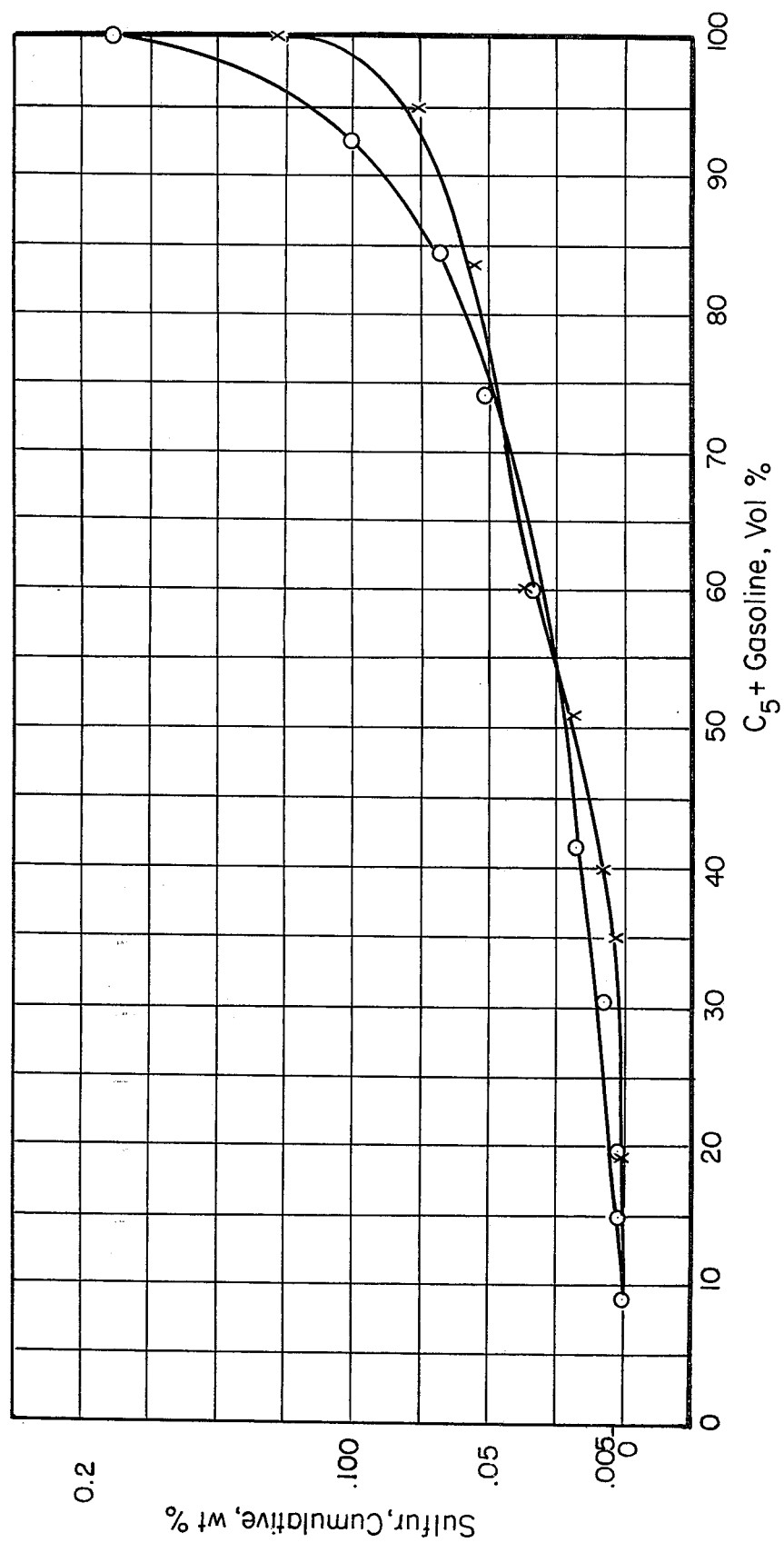

United States Patent [19]

Orkin

[11] 3,957,625

[45] May 18, 1976

[54] METHOD FOR REDUCING THE SULFUR LEVEL OF GASOLINE PRODUCT

[75] Inventor: Bernard A. Orkin, Cherry Hill, N.J.

[73] Assignee: Mobil Oil Corporation, New York, N.Y.

[22] Filed: Feb. 7, 1975

[21] Appl. No.: 547,892

[52] U.S. Cl. .............................. 208/211; 208/212; 208/218
[51] Int. Cl.² ........................................ C10G 23/02
[58] Field of Search ........... 208/211, 212, 209, 213, 208/216, 217

[56] References Cited
UNITED STATES PATENTS

| | | | |
|---|---|---|---|
| 2,070,295 | 2/1937 | Morrell | 208/211 |
| 2,114,852 | 4/1938 | McKittrick | 208/211 |
| 2,911,359 | 11/1959 | Hansford | 208/213 |
| 3,116,233 | 12/1963 | Douwes et al. | 208/217 |

*Primary Examiner*—Delbert E. Gantz
*Assistant Examiner*—G. J. Crasanakis
*Attorney, Agent, or Firm*—Charles A. Huggett; Carl D. Farnsworth

[57] ABSTRACT

Gasoline product of cracking desulfurized with a selective desulfurizing catalyst by processing particularly a high boiling portion thereof to minimize hydrogenation of desired olefins in the gasoline product of cracking.

4 Claims, 2 Drawing Figures

METHOD FOR REDUCING THE SULFUR LEVEL OF GASOLINE PRODUCT

BACKGROUND OF THE INVENTION

The catalytic hydrodesulfurization and hydrofining of hydrocarbon fractions is well known at this stage of the refining art. A great variety of catalysts and processing inovations have also been proposed for use. The primary requisites of the prior art catalysts are that they exhibit a high degree of activity for the hydrogenation reaction to be accomplished so that decomposition of the sulfur compounds in the charge as well as decomposition of nitrogen and/or oxygen compounds will be accomplished. It is also desirable in many of these hydrogenation reactions to minimize the scisson of carbon to carbon bonds resulting in the production of undesired light gases. It is also desirable in some hydrogenation processes to summarize the hydrogenation of some desired constituents comprising the feed being processed. It is known that most of the transitional metal oxides and sulfides which are not poisoned by sulfur, possess desired hydrodesulfurization activity. Some of the best known catalysts suitable for this purpose are cobalt molybdate supported on alumina, nickel-tungsten sulfide on various supports such as alumina and silica-alumina, molybdenum on alumina as well as some vanadium-alumina catalysts alone or promoted with magnesia.

Hydrogenation processes are subject to effecting olefin saturation which not only consumes hydrogen but lowers the octane number of resulting product such as gasoline product. At the present time it is desirable to reduce process economies and in the case of gasoline production it is desirable to maintain process derived gasoline product octane values in conjunction with providing an acceptable sulfur level in the product. This has become increasingly important with the environmental demands for high octane unleaded gasolines satisfying the requirements of the day and near future.

SUMMARY OF THE INVENTION

The present invention is concerned with an improved method for producing desired gasoline product quality satisfying a predetermined sulfur restriction.

In a particular aspect the present invention is concerned with the hydrodesulfurization of cracked gasoline under processing restraints and conditions particularly restricting the hydrogenation of olefins and minimizing the loss in (R+O) research octane number. The hydrodesulfurization operation of the present invention is completed in the presence of particularly selective catalyst compositions providing activity for the removal of undesired sulfur to a desired low value without adversely effecting the olefin content of the charge. The particularly selective catalysts found useful in the process of this invention include cobalt-molybdena on alumina and nickel-tungsten sulfide on a support such as alumina and either one promoted with an element selected from the group consisting of barium, magnesium or a rare earth metal.

The processing combination of the present invention is particularly enhanced by hydrofinishing only a selected heavy end portion of the sulfur containing gasoline charge, which heavy end portion will contain a major portion of the undesired sulfur and little of the desired olefins. The desulfurization operation of the present invention is carried out with minimal saturation of desired olefins thereby considerably restricting the lowering of product octane number. The cut point made in the gasoline product for desulfurizing according to this invention will vary considerably within the range of about 180°F. to about 300°F. The cut point will be determined as a function of the permissible product sulfur content and the charge stock sulfur content as well as the amount of desulfurization required.

The desulfurizing operation of the present invention is accomplished at a temperature within the range of 500°F. to 800°F. at a pressure in the range of 50 to 750 psig. The hydrogen to hydrocarbon ratio is preferably within the range of 1 to 10 and a reactant feed space velocity within the range of 2 to 20 LHSV. The catalyst is preferably retained as a fixed bed of catalyst. Fluid catalyst bed systems are also contemplated.

EXAMPLES

All of the desulfurization runs reported in Tables below were performed in a small isothermal, down-flow reactor. The start-up and run conditions were maintained substantially identical. After an exploratory search for selective catalyst compositions with a charge comprising heptene-1 and thiophene, the data reported below were obtained with the cracked gasoline feed identified in each table.

In Table 1 below, a gasoline product of fluid cracking boiling in the range of 107 to 446°F. and comprising sulfur of about 0.387 wt.%; a Br. No. of 60 and an octane number (R+O) of 91.3 was processed over the catalysts and conditions identified in Table 1.

TABLE 1

DESULFURIZATION OF FCC GASOLINE[1]

| Catalyst | Pressure PSIG | Temp. °F. | LHSV | (R+O) | % DS[2] | % SAT[3] |
|---|---|---|---|---|---|---|
| CoMo/Al | 100 | 600 | 6 | −10.1 | 93 | 69 |
|  | 100 | 600 | 3 | −12.1 | 96 | 85 |
|  | 500 | 600 | 6 | −14.3 | 91 | 97 |
|  | 500 | 600 | 3 | −15.7 | 96 | 98 |
| CoMo/Alumina + RE | 100 | 600 | 6 | − 8.0 | 87 | 36 |
|  | 100 | 600 | 3 | −10.2 | 94 | 52 |
|  | 500 | 600 | 3 | −12.1 | 99 | 95 |
| CoMo/Alumina + Ba | 100 | 600 | 6 | − 5.2 | 92 | 39 |
|  | 100 | 600 | 3 | − 8.8 | 94 | 59 |
|  | 500 | 600 | 6 | −13.8 | 90 | 95 |
| CoMo/Alumina + Mg | 100 | 600 | 6 | − 2.0 | 52 | 13 |
|  | 100 | 600 | 3 | − 3.4 | 73 | 21 |
|  | 500 | 600 | 3 | −13.4 | 89 | 97 |
| CoMo/Alumina | 100 | 600 | 6 | − 3.9 | 68 | 30 |

TABLE 1-continued

DESULFURIZATION OF FCC GASOLINE[1]

| Catalyst | Pressure PSIG | Temp. °F. | LHSV | (R+O) | % DS[2] | % SAT[3] |
|---|---|---|---|---|---|---|
| + Fe | 100 | 600 | 3 | −6.3 | 80 | 40 |

[1]S = .387 Br No. = 60 R+O = 91.3
[2]Wt. % desulfurization.
[3]As determined by decrease in bromine number.

It is clearly evident from an evaluation of the data of Table 1 that desulfurization of the full boiling range product gasoline was accompanied by a substantial loss in octane number. It is also clear that the cobalt-molybdena-alumina catalyst promoted with barium is superior to all the other catalysts in one or more areas of octane loss, percent desulfurization and percent saturation particularly at the lower pressure condition of 100 psig.

The work reported in Table 1 above was followed by treating with hydrogen for sulfur removal only a high boiling portion of the FCC gasoline and comprising about the bottom 43 percent of the gasoline product of fluid cracking. The untreated portion is combined with the treated portion to form the reconstituted gasoline for improvement determination. The high boiling gasoline charged to the desulfurization operation was a 280°F.+ gasoline boiling product fraction of fluid cracking comprising a sulfur content of 0.235 wt.% and a Br. No. of 15.50. The total FCC gasoline has a sulfur content of 0.123%, a Br. No. of 49.6 and an octane number (R+O) of 92.3. The reconstituted gasoline had a much lower sulfur level without product octane loss as shown by Table 2.

Table 2

DESULFURIZATION OF 280°F.+ GASOLINE AND PROPERTIES OF RE-CONSTITUTED GASOLINE

| Catalyst | Pressure PSIG | Temp. °F. | LHSV | Δ (R+O) | % DS | Br.No. |
|---|---|---|---|---|---|---|
| CoMo/Alumina | 100 | 600 | 6 | −1.3 | 76 | 54.1 |
|  | 200 | 600 | 6 | −1.9 | 74 | 54.4 |
|  | 500 | 600 | 6 | −1.6 | 76 | 52.1 |
| CoMo/Alumina +Ba | 100 | 600 | 6 | +0.1 | 75 | 55.8 |
|  | 200 | 600 | 6 | +0.1 | 76 | 55.3 |
|  | 500 | 600 | 6 | −0.5 | 76 | 54.0 |
|  | 100 | 600 | 10 | +1.2 | 69 | 55.6 |

The data of Table 2 show that 75% desulfurization can be achieved when hydrofinishing only a high boiling portion of the gasoline with little loss in (R+O) octane number when using a cobalt-molybdena-alumina catalyst and with substantially no loss when using the barium promoted catalyst.

In Table 3 below the data obtained are presented when processing a 200°F.+ gasoline product of fluid cracking under the desulfurizing conditions and catalysts shown.

Table 3

DESULFURIZATION OF 200°F. + GASOLINE AND RECONSTITUTED GASOLINE PROPERTIES

| Catalyst | Pressure PSIG | Temp. °F. | LHSV | Δ R+O | % DS |
|---|---|---|---|---|---|
| CoMo/Alumina | 100 | 600 | 6 | −2.1 | 88 |
|  | 200 | 600 | 6 | −3.0 | 89 |
|  | 500 | 600 | 6 | −3.9 | 85 |
| CoMo/Al+2% Ba | 200 | 600 | 6 | −3.3 | 90 |
|  | 500 | 600 | 6 | −3.6 | 87 |
| CoMo/Al+4% Ba | 100 | 600 | 6 | −1.0 | 84 |
|  | 200 | 600 | 6 | −1.2 | 89 |
|  | 500 | 600 | 6 | −3.0 | 86 |
| CoMo/Al+10% Ba | 100 | 600 | 6 | +0.2 | 58 |
| CoMo/Al+4% Mg | 200 | 600 | 6 | +0.4 | 59 |
|  | 500 | 600 | 6 | +0.1 | 70 |
|  | 100 | 600 | 6 | −0.5 | 86 |
|  | 200 | 600 | 6 | −1.8 | 89 |
|  | 500 | 600 | 6 | −3.0 | 87 |
| CoMo/Al+4% Cd | 100 | 600 | 6 | −0.2 | 78 |
|  | 200 | 600 | 6 | −0.7 | 85 |
|  | 500 | 600 | 6 | −1.8 | 83 |
| CoMo/Al+4% RE | 100 | 600 | 6 | −1.3 | 89 |
|  | 200 | 600 | 6 | −2.7 | 88 |
|  | 500 | 600 | 6 | −2.7 | 85 |

Charge S = .155% Br. No. = 45.0 (R+O) Octane Number = 92.3
Bottoms (67%) S = .219% Br. No. = 25.8

It is clear from the data of Table 3, that the barium promoted catalyst provided better overall results than the cobalt-molybdena catalyst containing no barium. It is also noted that a catalyst containing as much as 10 percent barium realized no significant octane loss under the lower desulfurizing results. The superiority of the barium promoted catalyst is clearly shown by the data presented above.

To facilitate a better understanding of the concepts of the present invention reference is now had to FIG. 1 which is a plot of data showing the sulfur content of gasoline products of cracking at various boiling points. In the specific example of FIG. 1 it is noted that the gasoline products do not exceed a cumulative sulfur level of about 0.025 wt. percent until you reach about a 55 percent boiling point. It is also noted that the cumulative sulfur level rapidly increases after you reach about the 75 percent boiling point.

Figure 2:
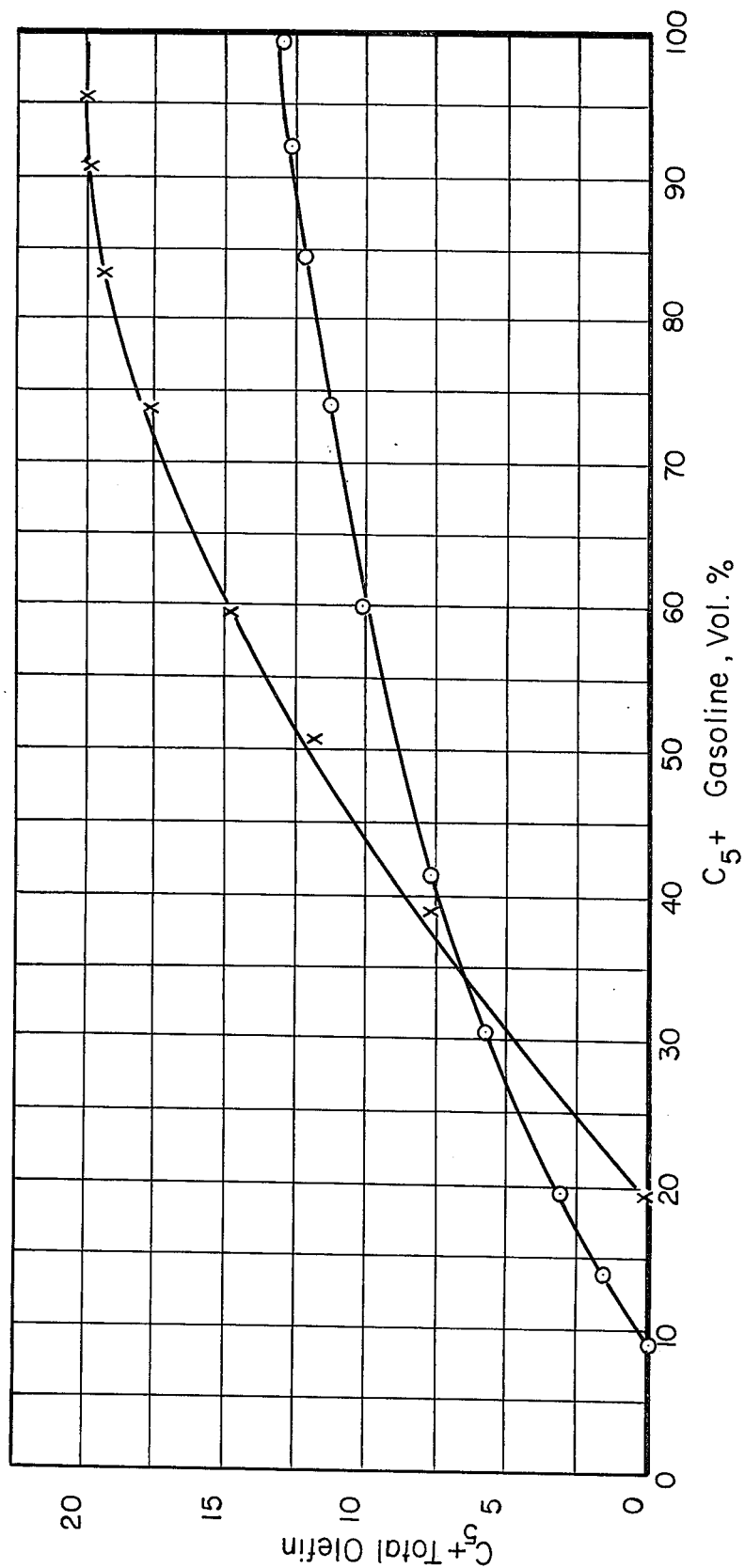

In FIG. 2, the olefin content of the gasoline product reported in FIG. 1 is provided. The graph of FIG. 2 shows that one of the gasoline products has a much higher olefin content than the other. These curves also indicate that a significant portion of the olefin content of the gasoline product occurs in the front end thereof. For example, in the curve represented by circles, which is the flatter curve, the cumulative olefin content above the 60 percent boiling point is relatively small. Thus when deslfurizing only a selected high boiling portion of the gasoline product such as that boiling above about its 60 percent boiling point, a significant sulfur reduction can be achieved with a limited reduction in olefin content.

Therefore the method and concepts of the present invention contemplate hydrofinishing all or selected portions of a sulfur containing gasoline product to provide a product of desired sulfur content without significant octane loss and the portion selected for hydrofinishing will be chosen as a function of the sulfur content of the gasoline to be processed and the sulfur reduction needed to meet predetermined requirements. As indicated above, the sulfur content of the charge relied upon to produce a cracked gasoline product will also influence the cut point selection referred to above. In any of these processing variations, it is proposed to use a barium modified cobalt-molybdate desulfurization catalyst comprising less than 10 weight percent but above about 2 weight percent barium.

Having thus generally described the invention and presented examples in support thereof, it is to be understood that no undue restrictions are to be imposed by reason thereof except as defined by the following claims.

I claim:

1. A method for reducing the sulfur content of a gasoline product derived from a cracking step which comprises;

a. fractionating said gasoline product at a cut point in the range of 180°–300°F to recover a high boiling portion thereof which includes undesired high levels of combined sulfur from a lower boiling olefin-rich gasoline fraction, b. contacting said high boiling portion of said gasoline product with a cobalt-molybdenum-alumina desulfurizing catalyst including a promoter selected from the group consisting of barium, magnesium, cadmium, and a rare earth under reaction conditions of temperature, pressure, and space velocity to effect desulfurizing thereof without substantially reducing the olefin content of the desulfurized product and c. blending the desulfurized product of step (b) with the remaining lower boiling olefin-rich portion of the gasoline product of step (a) to produce a desulfurized gasoline desired low sulfur content and high octane rating.

2. The method of claim 1 wherein desulfurization of said high boiling portion is accomplished at a temperature within the range of 5000° to 800°F, a pressure below 750 psig and a space velocity within the range of 2 to 20.

3. The method of claim 1 wherein aid desulfurizing catalyst comprises said promoter restricted to within the range of 2 to 10 weight percent based on said catalyst.

4. The method of claim 3 wherein said promoter comprises barium in an amount of at least 4 wt. % based on said catalyst.

* * * * *

UNITED STATES PATENT AND TRADEMARK OFFICE
CERTIFICATE OF CORRECTION

PATENT NO. : 3,957,625
DATED : May 18, 1976
INVENTOR(S) : BERNARD A. ORKIN

It is certified that error appears in the above-identified patent and that said Letters Patent are hereby corrected as shown below:

Column 2, Table 1, First Column, Line 1         "CoMo/Al" should be -- CoMo/Alumina --

Column 3, Table 3, First Column, Lines 2, 3, 4, 5, 6 and 7         In each line "CoMo/Al" should be -- CoMo/Alumina --

Column 4, line 67         "deslfurizing" should be -- desulfurizing --

Column 6, line 20         "5000°" should be -- 500° --

Column 6, line 23         "aid" should be -- said --

Signed and Sealed this

Nineteenth Day of October 1976

[SEAL]

Attest:

RUTH C. MASON
Attesting Officer

C. MARSHALL DANN
Commissioner of Patents and Trademarks